(12) United States Patent
Alexander et al.

(10) Patent No.: US 9,860,329 B2
(45) Date of Patent: Jan. 2, 2018

(54) DETERMINING CUSTOMIZED AUDIO SERVICES

(71) Applicant: International Business Machines Corporation, Armonk, NY (US)

(72) Inventors: Michael E. Alexander, Great Falls, VA (US); Amol A. Dhondse, Pune (IN); Anand Pikle, Pune (IN); Deepak Sekar, Chennai (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/792,680

(22) Filed: Jul. 7, 2015

(65) Prior Publication Data

US 2017/0013135 A1    Jan. 12, 2017

(51) Int. Cl.
*H04L 29/08* (2006.01)
*H04M 3/42* (2006.01)

(52) U.S. Cl.
CPC ........ *H04L 67/22* (2013.01); *H04M 3/42042* (2013.01); *H04M 3/42102* (2013.01); *H04M 3/42068* (2013.01); *H04M 2203/655* (2013.01)

(58) Field of Classification Search
CPC .. H04M 3/533; H04M 3/42017; H04M 3/487; H04L 67/22; H04W 4/12
USPC ........................................................ 455/413
See application file for complete search history.

(56) References Cited

U.S. PATENT DOCUMENTS

| 4,811,382 A | 3/1989 | Sleevi |
| 5,321,740 A | 6/1994 | Gregorek et al. |
| 6,768,788 B1 | 7/2004 | Orolin et al. |
| 6,889,054 B2 | 5/2005 | Himmel et al. |

(Continued)

OTHER PUBLICATIONS

Kryvinska, et al., "A Scenario of Service-oriented Principles Adaptation to the Telecom Providers Service Delivery Platform", 2010 Fifth International Conference on Software Engineering Advances, Copyright 2010 IEEE, pp. 265-271, <http://ieeexplore.ieee.org/stamp/stamp.jsp?tp=&arnumber=5615724>.

(Continued)

*Primary Examiner* — Vladimir Magloire
*Assistant Examiner* — Donald H Braswell
(74) *Attorney, Agent, or Firm* — Christopher McLane; Daniel R. Simek (57) ABSTRACT

In an approach for delivering customized messages, a computer receives a request to initiate a communication, wherein the request includes a caller and at least one recipient. The computer determines an identifier associated with the caller and an identifier associated with the at least one recipient from the received request. The computer identifies the caller and the at least one recipient based on the corresponding determined identifiers. The computer retrieves data associated with the identified caller and the identified at least one recipient, wherein the data includes personal information, Internet browsing trends, and listening preferences. The computer determines customized messages for the identified caller and the identified at least one recipient based on the retrieved data associated with the identified caller and the at least one recipient. The computer delivers the determined customized messages to one or more of the identified caller and the identified at least one recipient.

20 Claims, 3 Drawing Sheets

(56) References Cited

U.S. PATENT DOCUMENTS

| | | |
|---|---|---|
| 7,006,608 B2 | 2/2006 | Seelig et al. |
| 7,227,929 B2 | 6/2007 | Seelig et al. |
| 7,440,563 B2 | 10/2008 | Baiz Matuk |
| 8,327,395 B2 | 12/2012 | Lee et al. |
| 8,385,514 B2 | 2/2013 | Batni et al. |
| 8,732,246 B2 | 5/2014 | Jayanthi |
| 8,755,375 B2 | 6/2014 | Haley et al. |
| 2003/0050837 A1 | 3/2003 | Kim |
| 2007/0140446 A1 | 6/2007 | Haldeman et al. |
| 2007/0150480 A1 | 6/2007 | Hwang et al. |
| 2010/0211446 A1* | 8/2010 | Ray .................. G06Q 30/02 705/14.19 |
| 2010/0211456 A1 | 8/2010 | Reed et al. |
| 2013/0080447 A1* | 3/2013 | Ramer ............ G06F 17/30867 707/748 |
| 2013/0124478 A1 | 5/2013 | Ginzburg et al. |
| 2014/0040426 A1* | 2/2014 | Glaser .................. H04L 67/10 709/217 |

OTHER PUBLICATIONS

Mahajan, et al., "Next Generation Mobile Network Concepts, Technology and Sample Applications", Copyright 2010 IEEE, 6 pages, <http://ieeexplore.ieee.org/stamp/stamp.jsp?tp=&arnumber=5415906>.

Motorola, "Per Call Charging Methods for Prepaid PRBT (Personalized Ring Back Tone)", An Ip.com Prior Art Database Technical Disclosure, Ip.com No. 000133906, Publication Date: Feb. 15, 2006, Copyright Motorola, Inc. Feb. 15, 2006.

"A mechanism to dynamicly push advertisement accrding to user's interest", An IP.com Prior Art Database Technical Disclosure, IP.com No. 000195935, Publication Date May 24, 2010, 4 pages.

\* cited by examiner

DETERMINING CUSTOMIZED AUDIO SERVICES

BACKGROUND OF THE INVENTION

The present invention relates generally to the field of communication networks, and more particularly to providing customized audio services to a caller and recipients during a communication, such as a telephone or video call.

Every day, telephone calls connect subscribers with telecommunications devices via telecommunication service providers over telecommunication networks for the purpose of sending and receiving voice and data transmissions. The telecommunication networks include: computer networks, Internet, and telephone networks (e.g., land lines, mobile networks, and Voice over Internet Protocols) and enable the transference of voice and data transmissions between terminal nodes, such as telephones, computing devices, and mobile computing devices. However, the telecommunications service providers route the voice and data transmissions over the telecommunications network to and from identified subscribers over the Public Switched Telephone Network (PSTN). The PSTN consists of: telephone lines, fiber optic cables, microwave transmission links, cellular networks, communication satellites, and undersea telephone cables, which are all interconnected by switching centers, thus allowing any telecommunications device in the world to communicate with another.

Each subscriber is assigned a uniquely identifiable telephone number. For landlines and mobile network subscribers, telephone numbers are assigned through a fixed line telephone subscriber station connected to a telephone line or wireless telecommunication device that is registered within the PSTN. In a Voice over Internet Protocol (VoIP) communication, every phone number maps to a static Internet Protocol (IP) address. The static Internet Protocol address is a numerical label assigned to a computing device for identification and addressing. Each time a computing device engages in a call, the IP address is translated into the telephone number, which may be routed to another IP address (e.g., call is to another VoIP user) or handed over to the PSTN network (e.g., call is to a landline and/or a mobile network subscriber). As telephone numbers are unique, the telephone numbers serve as an address for switching telephone calls using a system of destination routing based on at least two end points, a calling party (i.e., caller), and the dialed number for the called party (i.e., recipient).

In addition to telephone services, computing devices connected to a telecommunications network may also be capable of providing additional utility, information, and connectivity. For example, mobile computing devices include a real-time operating system for providing cellular service (e.g., telephone calls) and an advanced mobile operating system for incorporating features of a personal computer and may also access the Internet to perform a variety of actions (e.g., Internet searches, e-mail, online transactions, etc.). When users access the Internet through mobile computing devices and computing devices, associated information may be included within big data. Big data describes voluminous amounts of structured, semi-structured, and unstructured data that includes: web server logs, Internet clickstream data, social media content, social network activity reports, text from e-mails, survey responses, mobile phone call detail records, and machine data that may be mined for information through big data analytics. Big data analytics examine large data sets to uncover hidden data patterns, unknown correlations, market trends, customer preferences, and other useful business information using advanced analytics (e.g., predictive analytics, data mining, text analytics, and statistical analysis). The analytical findings may then lead to more effective marketing, new revenue opportunities, better customer service, improved operational efficiencies, and competitive advantages.

SUMMARY

Aspects of the present invention disclose a method, computer program product, and system for delivering customized messages. The method includes one or more computer processors receiving a request to initiate a communication, wherein the request includes a caller and at least one recipient. The method further includes one or more computer processors determining an identifier associated with the caller and an identifier associated with the at least one recipient from the received request. The method further includes one or more computer processors identifying the caller and the at least one recipient based on the determined identifier associated with the caller and the determined identifier associated with the at least one recipient. The method further includes one or more computer processors retrieving data associated with the identified caller and the identified at least one recipient, wherein the data includes personal information, Internet browsing trends, and listening preferences. The method further includes one or more computer processors determining customized messages for the identified caller and the identified at least one recipient based at least in part on the retrieved data associated with the identified caller and the at least one recipient. The method further includes one or more computer processors delivering the determined customized messages to one or more of the identified caller and the identified at least one recipient.

DETAILED DESCRIPTION

When placing a telephone call, callers and recipients receive known audio tones that represent telephone call progress and status (e.g., dial tone, ring back tone, ringtone, busy signal, conference call, hold, etc.). Embodiments of the present invention recognize that while the audio tones provide information regarding progress and status, the audio tones do not enhance the experience of the caller and/or recipient in a meaningful manner. Embodiments of the present invention recognize actions that occur on mobile computing devices through the advanced mobile operating system including relevant user specific traceable information pertaining to the caller and recipients stored within big data. Embodiments of the present invention utilize big data analytics to extract information regarding both the caller and recipient (e.g., customized insight based data). Embodiments of the present invention then incorporate the customized data into the audio tones providing real-time audio services to the caller and recipients participating in a telephone call.

Figure 1:
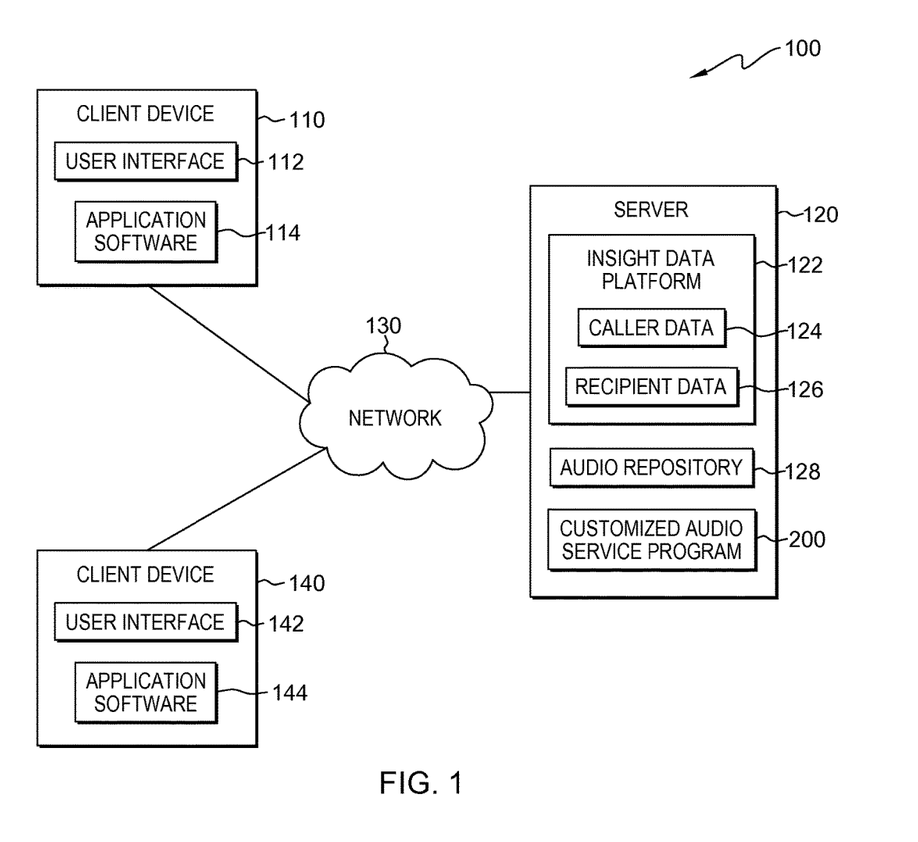
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110, client device 140, and server 120, all interconnected over network 130. Distributed data processing environment 100 may include additional computing devices, mobile computing devices, servers, computers, storage devices, or other devices not shown.

Client device 110 and client device 140 may be a web server or any other electronic device or computing system capable of processing program instructions and receiving and sending data. In some embodiments, client device 110 and client device 140 may be a laptop computer, a tablet computer, a netbook computer, a personal computer (PC), a desktop computer, a personal digital assistant (PDA), a smart phone, or any programmable electronic device capable of communicating with network 130. In general, client device 110 and client device 140 are representative of any electronic device or combination of electronic devices capable of executing machine readable program instructions as described in greater detail with regard to FIG. 3, in accordance with embodiments of the present invention. In the depicted embodiment, client device 110 and client device 140 (e.g., smart phones, mobile computing devices, etc.) are capable of initiating and receiving telephone calls (e.g., audio and/or video) between a caller (e.g., user of client device 110) and a recipient (e.g., user of client device 140). Client device 110 contains user interface 112 and application software 114. Client device 140 contains user interface 142 and application software 144.

User interface 112 and user interface 142 are programs that provides an interface between users of client device 110 and client device 140 and a plurality of applications that reside on client device 110 and client device 140 (e.g., application software 114, application software 144) and/or may be accessed over network 130. A user interface, such as user interface 112 and user interface 142, refers to the information (e.g., graphic, text, sound) that a program presents to a user and the control sequences the user employs to control the program. A variety of types of user interfaces exist. In one embodiment, user interface 112 and user interface 142 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to application software 114, insight data platform 122 (e.g., caller data 124), and customized audio service program 200. User interface 142 sends and receives information to application software 144, insight data platform 122 (e.g., recipient data 126), and customized audio service program 200.

Application software 114 and application software 144 are a set of one of more programs designed to carry out the operations for a specific application to assist a user to perform an activity (e.g., word processing programs, spread sheet programs, media players, web browsers, video chat, etc.). Information generated through user actions when connected to network 130 may be sent to insight data platform 122. For example, a user through user interface 112 utilizes a web browser (e.g., application software 114 or 144) and performs a search for hotel rooms in New York City for the Fourth of July. Through data mining techniques, information pertaining to the search, such as the location, date, length of stay, price range, number of rooms, etc., may be acquired and sent to insight data platform 122, which is stored specific to the user for future use. In the depicted embodiment, application software 114 and application software 144 reside on client device 110 and client device 140, respectively. In another embodiment, application software 114 and application software 144 may reside on server 120 or on another device (not shown) connected over network 130.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains insight data platform 122, audio repository 128, and customized audio service program 200.

Insight data platform 122 is a form of big data that utilizes big data analytics to determine preferences, personal information, and interests of individual users. Insight data platform 122 includes social media data, machine data, and transactional data. Social media data provides insights on consumer behavior and sentiment that may be integrated with customer relationship management (CRM) data for analysis. Machine data includes information generated from industrial equipment, real-time data from sensors that track parts and monitor machinery, and web logs that track user behavior online. Transactional data includes items, product IDs, prices, payment information, manufacturer and distributor data, etc. In the depicted embodiment, insight data platform 122 resides on server 120. In other embodiments, insight data platform 122 may represent a server computing system utilizing multiple computers as a server system, such as in a cloud computing environment, provided insight data platform 122 is accessible by customized audio service program 200. Insight data platform 122 receives information from client devices 110 and 140 through application software 114 and 144. Insight data platform 122 provides information to customized audio service program 200 specific to individual users. Insight data platform 122 also includes caller data 124 and recipient data 126.

Caller data 124 and recipient data 126 are results which occur after applying big data analytics to the information gathered from client devices 110 and 140 for insight data platform 122 (e.g., social media data, machine data, and transactional data that occurs through client devices 110 and 140 and respective instances of application software 114 and 144). For example, the information gathered for each user may include information pertaining to web server logs and Internet clickstream data (i.e., sequence of clicks or pages requested as a visitor explores a web site), social media content and social network activity reports, text from emails and survey responses, mobile phone call detail records, machine data captured by sensors, purchases, pricing information, etc. Caller data 124 includes information specific to the user of client device 110, and recipient data 126 includes information specific to the user of client device 140. In the depicted embodiment, only caller data 124 and recipient data 126 are shown; however, user data may be available for additional users of client devices (not shown). In the depicted embodiment, caller data 124 and recipient data 126 reside on server 120. In other embodiments, caller data 124 and recipient data 126 reside within a server computing system utilizing multiple computers as a server system, such as in a cloud computing environment, provided caller data 124 and recipient data 126 are accessible by customized audio service program 200.

For example, a user creates a digital footprint when utilizing computers and the Internet. The digital footprints refer to the trails or traces of information left behind in a digital environment (e.g., forum registrations, e-mails, uploads, images, activity, etc.), which may be stored as cookies (i.e., small pieces of data tracking online activity) or computer memory as files indicating actions performed on a computing device. Based on the digital footprints, knowledge about the user and the information which may have been accessed and/or created by the user may be discerned through data collection techniques and analyses, such as spider programs, text analytics, and data mining, which results in caller data 124 and recipient data 126.

Audio repository 128 is a collection of audio output files. Audio output files store a recording of a captured sound as digital audio data on a computer system that can be played back to a user as an audible sound (e.g., ringtones, vocalized greeting, messages, announcement, music files, etc.). Audio repository 128 may also include video files that include both images and audio within the output file (e.g., advertisements, commercials, music videos, etc.). In the depicted embodiment, audio repository 128 resides on server 120. In another embodiment, audio repository 128 may reside on a client device, such as client device 110 and client device 140. In some other embodiment, audio repository 128 may reside on another server or computing device (not shown) provided that audio repository 128 is accessible to client device 110, client device 140, and customized audio service program 200.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Customized audio service program 200 is a program for providing customized audio services from audio repository 128 to the caller and the recipient(s) during the course of a telephone call based on user data (e.g., caller data 124 and recipient data 126) from insight data platform 122. Customized audio service program 200 utilizes individual user data acquired from big data and the application of big data analytics to determine relevant information pertaining to the individual users. In the depicted embodiment, customized audio service program 200 resides on server 120. In another embodiment, customized audio service program 200 may reside on a client device, such as client devices 110 and 140. In some other embodiment, customized audio service program 200 may reside on another server or computing device (not shown), provided customized audio service program 200 is accessible by client device 110 and client device 140 and has access to insight data platform 122 and audio repository 128.

Figure 2:
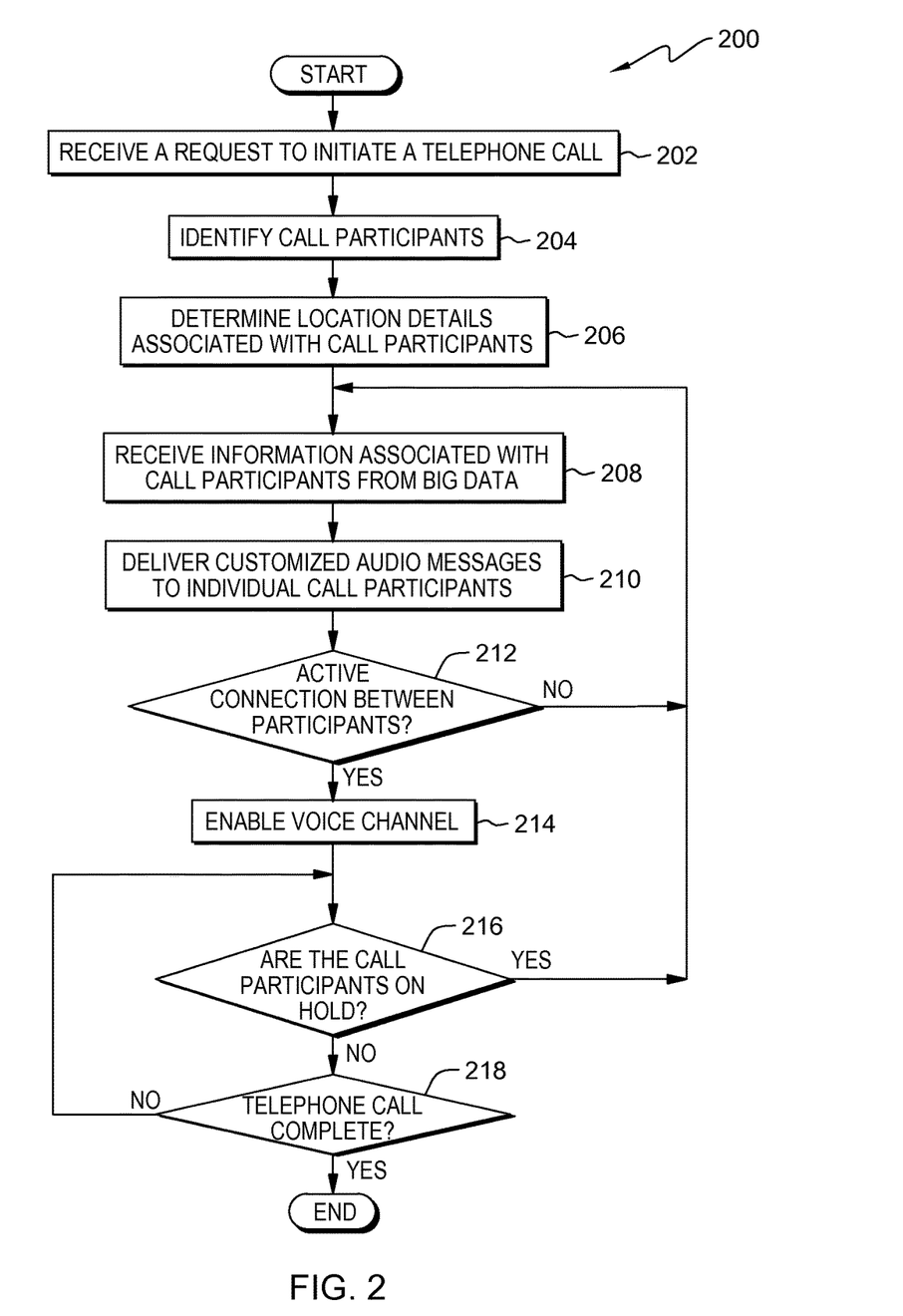
FIG. 2 is a flowchart depicting operational steps of a customized audio service program on a server computer within the data processing environment of FIG. 1 for providing customized audio services to callers and recipients of a telephone call, in accordance with an embodiment of the present invention.

FIG. 2 is a flowchart depicting operational steps of customized audio service program 200, on a server computer within distributed data processing environment 100 of FIG. 1, for providing customized audio services to callers and recipients of a telephone call, in accordance with an embodiment of the present invention. As users utilize client devices (e.g., client devices 110 and 140) to access the Internet through application software (e.g., application software 114 and 144), big data platforms (e.g., insight data platform 122) record information detailing the access (e.g., social media, transactions, web browser history, etc.). The big data platforms may then apply big data analytics to identify and store information pertaining to an individual user (e.g., caller data 124 and recipient data 126) for further use.

In step 202, customized audio service program 200 receives a request to initiate a telephone call over network 130 (e.g., communication between at least two users over landlines, mobile network, VoIP, etc.). A telephone call can be any form of communication over network 130. In the depicted embodiment, the user of client device 110 represents the caller (i.e., places a telephone call), and the user of client device 140 represents the recipient (i.e., answered the placed telephone call). In another embodiment, the caller and the recipient of a telephone call may be reversed or the caller and/or recipient may be another user (not shown). In some other embodiment, multiple recipients (not shown) may be associated with the caller, such as in a conference call (e.g., communication between a caller and at least two recipients). In one embodiment, customized audio service program 200 receives a request to initiate an audio telephone call (e.g., any form of audio communication over network 130 that does not include a video component). For example, when placing a telephone call, the user of client device 110 (e.g., caller) through user interface 112 dials the telephone number associated with client device 140 (e.g., recipient) and then selects send. Client device 110 sends a message over network 130 via the service provider to customized audio service program 200 and to the Public Switched Telephone Network (PSTN).

In another embodiment, customized audio service program 200 receives a request to initiate a video call that includes both audio and video data (e.g., places a call through a computing device enabled with a web camera and microphone). For example, the user of client device 110 (e.g., caller) logs into a video calling service included within installed application software 114. The caller initiates a video call by selecting a recipient from a list (e.g., phone book, call history, etc.) of additional known users also utilizing the same video calling service and/or entering a telephone number for the user of client device 140 (e.g., recipient). The caller selects the type of call to be audio and video and selects call. Client device 110 sends a message through the video calling service over network 130 via the service provider to customized audio service program 200 and the PSTN.

In one embodiment, customized audio service program 200 receives a request to initiate a telephone call between two individuals, the caller and recipient. In some other embodiment, customized audio service program 200 receives a request to initiate a conference call between more than two individuals (e.g., three-way call, Conference Bridge, party line, group call, etc.) and connects multiple recipients to a single caller. Continuing the previous example, when placing a three-way call, after establishing a connection with the first recipient, the caller selects the flash button through user interface 112 on client device 110 and places the first recipient on hold. The caller then enters a second telephone number through user interface 112 and selects send. Client device 110 sends a second message over network 130 via the service provider to customized audio service program 200 and the PSTN. To connect the caller and the two recipients in a three-way call, the caller again selects the flash button through user interface 112.

In step 204, customized audio service program 200 identifies the call participants. Customized audio service program 200 receives a message, such as an origination message, over network 130 from client device 110 that includes at least the telephone number of the caller and recipient. For example, a mobile phone sends an origination message that includes a mobile identification number (MIN) that is the phone number of the smart phone, the electronic serial number (ESN) for the smart phone, and the telephone number dialed for the recipient. Telephone numbers are based on standard E.164, the international public telecommunication numbering plan, which defines a numbering plan for the worldwide PSTN and additional data networks, as set by the International Telecommunications Union (ITU) standardization sector. Telephone numbers based on standard E.164 may be up to fifteen digits long, based on the assigned country calling code, area and/or city code, central office code, and an individual subscriber number. VoIP telephone numbers are also based on the E.164 standard, but VoIP telephone numbers also utilize uniform resource identifier (URI) mapping that translates the telephone number into Internet addresses (e.g., reverses the order of the telephone number and places a "." between the individual numbers). Customized audio service program 200 decodes the caller and recipient telephone numbers based on standard E.164 and identifies the country, area and/or city, exchange, and specific subscriber information relative to the caller and recipient(s).

For example, the origination message includes a MIN of 1-404-741-1234 and a dialed number of 1-305-550-5678. Customized audio service program 200 separates the MIN into the country calling code of "1," the area code of "404," the central office code of "741," and the individual subscriber number of "1234." Customized audio service program 200 identifies that the "1" represents the United States, "404" represents Atlanta, Ga., "741" represents one of 800 exchanges within the city of Atlanta, and "1234" represents the caller utilizing client device 110. Customized audio service program 200 also separates the dialed number into the country calling code of "1," the area code of "305," the central office code of "550," and the individual subscriber number of "5678." Customized audio service program 200 identifies that the "1" represents the United States, "305" represents Miami, Fla., "550" represents one of 1021 exchanges within the city of Miami, and "5678" represents the recipient utilizing client device 140.

In step 206, customized audio service program 200 determines location details associated with the call participants. In one embodiment, customized audio service program 200 determines location details associated with the call participants based on the information within the telephone numbers. For example, client device 110 is a landline phone and is therefore associated with a fixed location. The country calling code is "1" and the area code is "716", which identifies a location in Buffalo, N.Y. within the United States. Customized audio service program 200 may also identify additional location details through the central office code, which notes a smaller area within Buffalo, and the subscriber number, which identifies the specific subscriber, and the service provider may be able to provide an associated street address for the specific subscriber.

In another embodiment, customized audio service program 200 determines location details associated with the call participants by determining the location of client device 110 and/or client device 140 based on received information. For example, client devices 110 and 140 may be mobile computing devices; and therefore, a telephone call may be initiated from any location capable of connecting to network 130. The location of client devices 110 and 140 may be found through triangulation. Triangulation is the process of determining the location of a mobile computing device (e.g., client devices 110 or 140) by measuring the radial distance, or the direction, of the received time delay (equates to a distance) between the mobile computing device and two or three different mobile phone towers. Customized audio service program 200 then calculates the approximate location of the mobile computing device to be at the point of intersection of the resultant circles. In some other embodiment, customized audio service program 200 receives an approximate location through receipt of a unique identifier over a piconet connection that is then identified over the Internet and includes corresponding location information. Customized audio service program 200 can utilize the determined location of client device 110 and/or client device 140 to identify additional location details (e.g., time of day, nearby establishments, street address, etc.).

In step 208, customized audio service program 200 retrieves information associated with call participants from insight data platform 122 (e.g., specific to individual call participants). When users access the Internet through mobile computing devices and computing devices such as client devices 110 and 140, insight data platform 122 records big data with metadata specific to individual users. For example, the metadata may include an IP address, an e-mail address, a name, a unique identifier, a phone number, etc., specific to individual users stored within the actions the specific user performs online, such as browsing history, searches, social media content, social network activity reports, text from e-mails, mobile phone call detail records, account details, email activity, account passwords, etc. Insight data platform 122 applies data mining techniques based on a unique identifier (e.g., IP address, telephone number, e-mail address, etc.) to the big data and stores results specific to the individual user (e.g., caller data 124 and recipient data 126). Insight data platform 122 utilizes an aggregation steward to gather, process, and analyze the individual user results in order to derive meaningful insights into the user data and create a correlation to other sources. Additionally, insight data platform 122 may incorporate in-stream processing to incorporate streaming data into the aggregation steward allowing real-time updates to be incorporated. For example, while placing a telephone call, the user of client device 110 shops online for kitchen appliances. Through in-stream processing, insight data platform 122 receives the data which the aggregation steward incorporates into previously stored results.

Customized audio service program 200 queries insight data platform 122 for the data associated with the caller and recipient. For example, within the origination message, customized audio service program 200 identifies the caller and recipient based on the telephone numbers. Customized audio service program 200 queries insight data platform 122 with the caller and recipient telephone numbers. Customized audio service program 200 receives the results of the queries from insight data platform 122, which includes caller data 124 and recipient data 126. Within caller data 124, the aggregation steward identifies information including: the birthdate of the caller, recent website activity for searches related to refrigerators, dishwashers, and ovens, between 9 am and 1 pm the caller listens to a news channel, and from 8 pm to 10 pm the caller listens to classical music. Within recipient data 126 the aggregation steward identifies information including: the wedding anniversary of the recipient, recent website activity indicates configuring a truck from two different manufacturers, between 8 am and 5 pm the recipient listens to a rock music station, and at 6 pm the recipient listens to sports.

In one embodiment, customized audio service program 200 may receive additional information associated with the caller and/or the recipient from insight data platform 122 while waiting for the connection to be established between the caller and recipient (e.g., waiting for the recipient to answer the telephone call). For example, an announcement was originally delivered to both the caller and recipient, but the telephone call is still not connected as the recipient did not answer the telephone. Customized audio service program 200 may access insight data platform 122 again and receives listening preferences instead of announcements for the caller and recipient.

In another embodiment, customized audio service program 200 may receive additional information associated with the call participants on hold from insight data platform 122. While in a hold condition, customized audio service program 200 may include predefined criteria, such as time limits, completion of delivering announcements and/or advertisements, repeating cycles, etc., to provide dynamic customized messages to the call participants. In some other embodiment, customized audio service program 200 may access insight data platform 122 again in order to acquire updated customized messages to provide to call participants. For example, when initially placed on hold, the recipient receives two advertisements for trucks. Customized audio service program 200 determines the recipient is still on hold after receiving the truck advertisements. Therefore, rather than continuously repeating the same customized messages, customized audio service program 200 queries recipient data 126 again and identifies the recipient includes a listening preference of rock music.

In step 210, customized audio service program 200 delivers customized messages to individual call participants based on the retrieved data from insight data platform 122. In one embodiment, the customized messages are audio messages. For example, a telephone call placed on a land line telephone is only capable of delivering audio messages to both the caller and/or the recipient. In another embodiment, customized messages may include audio and video components. For example, a video conference call may provide commercials, music videos, etc., that include audio and video components to the communication allowing an individual to view and listen to the customized message. Customized audio service program 200 may deliver customized messages from audio repository 128 at any point when a telephone call is not connected to an active voice channel (e.g., while initiating a telephone call, hold, etc.). In one embodiment, customized audio service program 200 delivers customized messages to the caller and/or recipient by replacing the standard tones with customized messages from audio repository 128 (e.g., audio and/or video). In another embodiment, customized audio service program 200 may deliver a reduced set of customized messages for audio repository 128 based on user preferences selected during set up. For example, a user may not want to receive advertisements and elects to only receive announcements and/or listening preferences. In another example, a user may select to receive standard ring back tones and ringers instead of announcements and receives advertisements and listening preferences when placed on hold.

Customized audio service program 200 determines the customized messages based on the type of service (e.g., hold, ring tone, engage tone, ringer, voice mail, etc.) and the insights within the user data (e.g., caller data 124, recipient data 126). For example, customized audio service program 200 may determine a customized message based upon the time of day, location of the user, most recent browsing history, etc. Customized audio service program 200 may then access audio repository 128 to identify the customized message and delivers the customized message to the telephone call participants (e.g., each participant receives customized messages). In one embodiment, customized audio service program 200 delivers announcements and/or greetings to call participants. In another embodiment, customized audio service program 200 delivers advertisements to call participants. In some other embodiment, customized audio service program 200 delivers user listening preferences (e.g., music, news, sports, etc.) to call participants. In yet some other embodiment, customized audio service program 200 delivers one or more of the aforementioned customized messages to call participants.

For example, the average time to answer a ringing telephone is approximately nine seconds, which may be enough time for customized audio service program 200 to deliver a brief announcement. Based on recipient data 126, customized audio service program 200 replaces the ring back tone of the caller with an announcement stating, "Today is Tom's wedding anniversary" from audio repository 128. Based on caller data 124, customized audio service program 200 replaces the ringer of the recipient with an announcement stating, "Today is Mary's birthday" from audio repository 128. Therefore, the caller and recipient receive reminders of the significance of the date respective to the other call participant and may utilize the information once the telephone call connects.

In another example, when a call participant is placed on hold, the time associated with a hold may be considerably longer and allows enough time for customized audio service program 200 to deliver advertisements and/or listening preferences to a call participant while waiting for a telephone call to resume. A telephone call is placed at 10 am between the user of client device 110 (e.g., caller) and the user of client device 140 (e.g., recipient). When the recipient is placed on hold, customized audio service program 200 utilizes the local time for the recipient, and based on the insights within recipient data 126, customized audio service program 200 delivers rock music to the recipient (e.g., music video, audio file). However, if the same call were to occur at 7 pm, customized audio service program 200, based on the local time and insights within recipient data 126, can deliver a sportscast to the recipient.

In yet another example, a conference call takes place at noon in which both the user of client device 110 and the user of client device 140 participate in and are placed on hold. Customized audio service program 200 utilizes the local time with respect to the user of client device 110 and the user of client device 140 in conjunction with the insights within caller data 124 and recipient data 126 and delivers a newscast to the caller and rock music to the recipient. Additionally, customized audio service program 200 may deliver advertisements for kitchen appliances to the caller and advertisements for local truck dealerships to the recipient from audio repository 128 by incorporating the location of the recipient into the insights within recipient data 126.

In decision 212, customized audio service program 200 determines whether active connection occurs between telephone call participants. Customized audio service program 200 determines an active connection occurs between telephone call participants when the telephone call moves to an active voice channel. In one embodiment, customized audio service program 200 determines an active connection occurs when the recipient answers an incoming telephone call. In another embodiment, customized audio service program 200 determines an active connection occurs when the telephone call returns to an active connection in response to removing the hold condition from the telephone call. If customized audio service program 200 determines active connections occur between telephone call participants (decision 212, yes branch), then customized audio service program 200 enables the voice channel (step 214). If customized audio service program 200 determines active connections do not occur between telephone call participants (decision 212, no branch), then customized audio service program 200 retrieves customized messages for call participants from insight data platform 122 (step 208).

In step 214, customized audio service program 200 enables the voice channel. In one embodiment, customized audio service program 200 enables audio only (utilizes only a microphone). In another embodiment, customized audio service program 200 enables audio and video (e.g., utilizing webcam and microphone). When a recipient answers the telephone call and/or the call is removed from hold, the service provider transfers the call to an unused voice channel. Customized audio service program 200 discontinues delivery of customized messages (e.g., stops sending rock music to the recipient) so conversation can begin and/or resume.

In decision 216, customized audio service program 200 determines whether a call participant is on hold. Customized audio service program 200 determines a call participant is on hold when any of the call participants, through a user interface (e.g., user interface 112, user interface 142), activates a hold function. When a telephone call is placed on hold, the connection between telephone call participants remains, but verbal communication is not possible until the telephone call is removed from hold. Customized audio service program 200 determines the status on the voice channel (e.g., active or hold status). If customized audio service program 200 determines either call participant is on hold (decision 216, yes branch), then customized audio service program 200 retrieves customized messages for call participants from insight data platform 122 (step 208) and delivers customized messages from audio repository 128 in place of standard tones associated with a hold function (e.g., no sound, generic background music, company advertisements, etc.). If customized audio service program 200 determines the call participants are not on hold (decision 216, no branch), then customized audio service program 200 determines whether the telephone call is complete (decision 218).

In decision 218, customized audio service program 200 determines whether a telephone call is complete. Customized audio service program 200 determines a telephone call is not complete when the voice channel between participants is still active (e.g., call participants have not disconnected, conversation continues, call placed on hold, etc.). If customized audio service program 200 determines the telephone call is not complete (decision 218, no branch), then the voice channel remains active and communication continues and customized audio service program 200 determines whether call participants are on hold (decision 216). Customized audio service program 200 determines a call is complete when the voice channel between call participants in no longer active (e.g., call participant ends call by hanging up). If customized audio service program 200 determines the telephone call is complete (decision 218, yes branch), then customized audio service program 200 completes.

Figure 3:
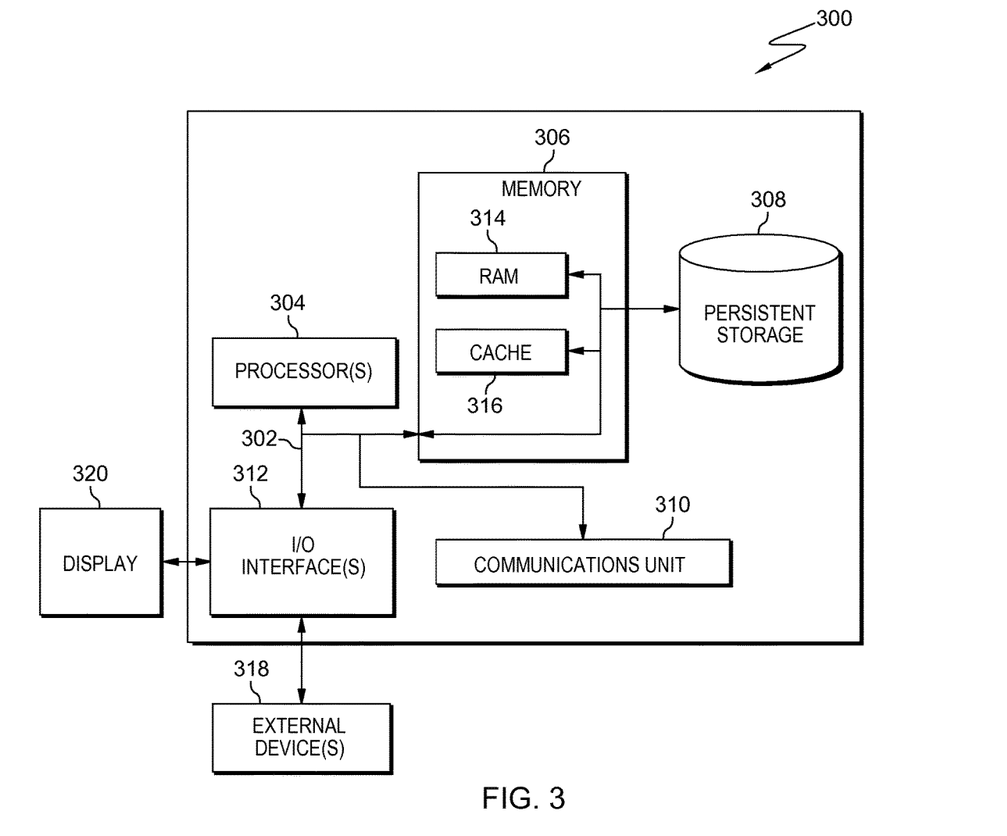
FIG. 3 is a block diagram of components of the distributed data processing environment executing the customized audio service program, in accordance with an embodiment of the present invention.

FIG. 3 depicts a block diagram of components of distributed data processing environment 300, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Distributed data processing environment 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

User interface 112, user interface 142, application software 114, application software 144, insight data platform 122, caller data 124, recipient data 126, audio repository 128, and customized audio service program 200 are stored in persistent storage 308 for execution and/or access by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of enterprise grid and client devices. In these examples, communications unit 310 includes one or more network interface cards. Communications unit 310 may provide communications through the use of either or both physical and wireless communications links. User interface 112, user interface 142, application software 114, application software 144, insight data platform 122, caller data 124, recipient data 126, audio repository 128, and customized audio service program 200 may be downloaded to persistent storage 308 through communications unit 310.

I/O interface(s) 312 allows for input and output of data with other devices that may be connected to distributed data processing environment 300. For example, I/O interface(s) 312 may provide a connection to external device(s) 318, such as a keyboard, a keypad, a touch screen, and/or some other suitable input device. External device(s) 318 can also include portable computer readable storage media such as, for example, thumb drives, portable optical or magnetic disks, and memory cards. Software and data used to practice embodiments of the present invention, e.g., user interface 112, user interface 142, application software 114, application software 144, insight data platform 122, caller data 124, recipient data 126, audio repository 128, and customized audio service program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for delivering customized messages, the method comprising:

receiving, by one or more computer processors, a request to initiate a communication, wherein the request includes a caller and at least one recipient;

determining, by one or more computer processors, an identifier associated with the caller and an identifier associated with the at least one recipient from the received request;

identifying, by one or more computer processors, the caller and the at least one recipient based on the determined identifier associated with the caller and the determined identifier associated with the at least one recipient;

retrieving, by one or more computer processor, data associated with the identified caller and data associated with the identified at least one recipient, wherein the data is based at least in part on social media data, machine data, and transactional data, wherein the data includes personal information, Internet browsing trends, and listening preferences;

determining, by one or more computer processors, a first customized message for the identified caller based at least in part on the retrieved data associated with the identified caller and a second customized message for the identified at least one recipient based at least in part on the retrieved data associated with the identified at least one recipient;

identifying, by one or more computer processors, a type of service that includes at least a hold, a ring tone, an engage tone, and a ringer, wherein each individual type of service includes an associated average length of time over which each of the individual type of service takes place;

determining, by one or more computer processors, a location associated with the identified caller and a location associated with the identified at least one recipient;

determining, by one or more computer processors, a time of day associated with the determined location associated with the identified caller and a time of day associated with the determined location associated with the identified at least one recipient;

identifying, by one or more computer processors, relevant information associated with the identified caller within the retrieved data associated with the identified caller based on one or more of the following: the determined location and the determined time of day associated with the identified caller;

determining, by one or more computer processors, the first customized message for the identified caller within the identified relevant information associated with the identified caller based at least in part on the associated average length of time of the identified type of service;

identifying, by one or more computer processors, relevant information associated with the identified at least one recipient within the retrieved data associated with the identified at least one recipient based on one or more of the following: the determined location and the determined time of day associated with the identified at least one recipient;

determining, by one or more computer processors, the second customized message for the identified at least one recipient within the identified relevant information associated with the identified at least one recipient based at least in part on the associated average length of time the identified type of service; and delivering, by one or more computer processors, the determined first customized message for the identified caller and the determined second customized message for the identified at least one recipient to one or more of the identified caller and the identified at least one recipient.

2. The method of claim 1, wherein the first customized message for the identified caller and the determined second customized message for the identified at least one recipient is selected from a group consisting of:

an announcement, wherein the announcement is a greeting based at least in part on the personal information;

an advertisement, wherein the advertisement is based at least in part on the Internet browsing trends; and a listening preference, based at least in part of the personal information.

3. The method of claim 1, wherein delivering the determined first customized message for the identified caller and the determined second customized message for the identified at least one recipient to one or more of the identified caller and the identified at least one recipient further comprises:

determining, by one or more computer processors, whether a voice channel is enabled;

responsive to determining the voice channel is not enabled, retrieving, by one or more computer processors, the determined first customized message for the identified caller that is a customized audio response for the identified caller, and the determined second customized message for the identified at least one recipient that is a customized audio response for the identified at least one recipient, from a repository; and replacing, by one or more computer processors, one or more or the following: a ringtone of the caller and a ring back tone of the at least one recipient, with the determined first customized message for the identified caller and the determined second customized message for the identified at least one recipient from the repository.

4. The method of claim 1, wherein delivering the determined first customized message for the identified caller and the determined second customized message for the identified at least one recipient to one or more of the identified caller and the identified at least one recipient further comprises:

determining, by one or more computer processors, whether a voice channel is on hold;

responsive to determining the voice channel is on hold, identifying, by one or more computer processors, at least one participant on hold;

retrieving, by one or more computer processors, data associated with the identified at least one participant on hold, wherein the data includes personal information, Internet browsing trends, and listening preferences;

retrieving, by one or more computer processors, the first customized message from a repository based on the retrieved data associated with the identified at least one participant on hold; and replacing, by one or more computer processors, a hold tone of the identified at least one participant on hold with the retrieved first customized message.

5. The method of claim 1, wherein the communication comprises: telephone calls, video calls, and conference calls.

6. The method of claim 1, wherein the identifier comprises: telephone numbers and Internet Protocol addresses that uniquely identify the identified caller and the identified at least one recipient within the data.

7. A computer program product for delivering customized messages, the computer program product comprising:

one or more computer readable storage media and program instructions stored on the one or more computer readable storage media, the program instructions comprising:

program instructions to receive a request to initiate a communication, wherein the request includes a caller and at least one recipient;

program instructions to determine an identifier associated with the caller and an identifier associated with the at least one recipient from the received request;

program instructions to identify the caller and the at least one recipient based on the determined identifier associated with the caller and the determined identifier associated with the at least one recipient;

program instructions to retrieve data associated with the identified caller and data associated with the identified at least one recipient, wherein the data is based at least in part on social media data, machine data, and transactional data, wherein the data includes personal information, Internet browsing trends, and listening preferences;

program instructions to determine a first customized message for the identified caller based at least in part on the retrieved data associated with the identified caller and a second customized message for the identified at least one recipient based at least in part on the retrieved data associated with the identified at least one recipient;

program instructions to identify a type of service that includes at least a hold, a ring tone, an engage tone, and a ringer, wherein each individual type of service includes an associated average length of time over which each of the individual type of service takes place;

program instructions to determine a location associated with the identified caller and a location associated with the identified at least one recipient;

program instructions to determine a time of day associated with the determined location associated with the identified caller and a time of day associated with the determined location associated with the identified at least one recipient;

program instructions to identify relevant information associated with the identified caller within the retrieved data associated with the identified caller based on one or more of the following: the determined location and the determined time of day associated with the identified caller;

program instructions to determine the first customized message for the identified caller within the identified relevant information associated with the identified caller based at least in part on the associated average length of time of the identified type of service;

program instructions to identify relevant information associated with the identified at least one recipient within the retrieved data associated with the identified at least one recipient based on one or more of the following: the determined location and the determined time of day associated with the identified at least one recipient;

program instructions to determine the second customized message for the identified at least one recipient within the identified relevant information associated with the identified at least one recipient based at least in part on the associated average length of time of the identified type of service; and program instructions to deliver the determined first customized message for the identified caller and the determined second customized message for the identified at least one recipient to one or more of the identified caller and the identified at least one recipient.

8. The computer program product of claim 7, wherein the determined first customized message for the identified caller and the determined second customized message for the identified at least one recipient is selected from a group consisting of:

an announcement, wherein the announcement is a greeting based at least in part on the personal information;

an advertisement, wherein the advertisement is based at least in part on the Internet browsing trends; and a listening preference based at least in part of the personal information.

9. The computer program product of claim 7, wherein delivering the determined first customized message for the identified caller and the determined second customized message for the identified at least one recipient to one or more of the identified caller and the identified at least one recipient further comprises program instructions, stored on the one or more computer readable storage media, to:

determine whether a voice channel is enabled;

responsive to determining the voice channel is not enabled, retrieve the determined first customized message for the identified caller that is a customized audio response for the identified caller, and the determined second customized message for the identified at least one recipient that is a customized audio response for the identified at least one recipient, from a repository; and replace one or more or the following: a ringtone of the caller and a ring back tone of the at least one recipient, with the determined first customized message for the identified caller and the determined second customized message for the identified at least one recipient from the repository.

10. The computer program product of claim 7, wherein delivering the determined first customized message for the identified caller and the determined second customized message for the identified at least one recipient to one or more of the identified caller and the identified at least one recipient further comprises program instructions, stored on the one or more computer readable storage media, to:

determine whether a voice channel is on hold;
responsive to determining the voice channel is on hold, identify at least one participant on hold;
retrieve data associated with the identified at least one participant on hold, wherein the data includes personal information, Internet browsing trends, and listening preferences;
retrieve the first customized message from a repository based on the retrieved data associated with the identified at least one participant on hold; and
replace a hold tone of the identified at least one participant on hold with the retrieved first customized message.

11. The computer program product of claim 7, wherein the communication comprises: telephone calls, video calls, and conference calls.

12. The computer program product of claim 7, wherein the identifier comprises: telephone numbers and Internet Protocol addresses that uniquely identify the identified caller and the identified at least one recipient within the data.

13. A computer system for delivering customized messages, the computer system comprising:

one or more computer processors, one or more computer readable storage media, and program instructions stored on the computer readable storage media for execution by at least one of the one or more processors, the program instructions comprising:
program instructions to receive a request to initiate a communication, wherein the request includes a caller and at least one recipient;
program instructions to determine an identifier associated with the caller and an identifier associated with the at least one recipient from the received request;
program instructions to identify the caller and the at least one recipient based on the determined identifier associated with the caller and the determined identifier associated with the at least one recipient;
program instructions to retrieve data associated with the identified caller and data associated with the identified at least one recipient, wherein the data is based at least in part on social media data, machine data, and transactional data, wherein the data includes personal information, Internet browsing trends, and listening preferences;
program instructions to determine a first customized message for the identified caller based at least in part on the retrieved data associated with the identified caller and a second customized message for the identified at least one recipient based at least in part on the retrieved data associated with the identified at least one recipient;
program instructions to identify a type of service that includes at least a hold, a ring tone, an engage tone, and a ringer, wherein each individual type of service includes an associated average length of time over which each of the individual type of service takes place;
program instructions to determine a location associated with the identified caller and a location associated with the identified at least one recipient;
program instructions to determine a time of day associated with the determined location associated with the identified caller and a time of day associated with the determined location associated with the identified at least one recipient;
program instructions to identify relevant information associated with the identified caller within the retrieved data associated with the identified caller based on one or more of the following: the determined location and the determined time of day associated with the identified caller;
program instructions to determine the first customized message for the identified caller within the identified relevant information associated with the identified caller based at least in part on the associated average length of time of the identified type of service;
program instructions to identify relevant information associated with the identified at least one recipient within the retrieved data associated with the identified at least one recipient based on one or more of the following: the determined location and the determined time of day associated with the identified at least one recipient;
program instructions to determine the second customized message for the identified at least one recipient within the identified relevant information associated with the identified at least one recipient based at least in part on the associated average length of time of the identified type of service; and
program instructions to deliver the determined first customized message for the identified caller and the determined second customized message for the identified at least one recipient to one or more of the identified caller and the identified at least one recipient.

14. The computer system of claim 13, wherein the determined first customized message for the identified caller and the determined second customized message for the identified at least one recipient is selected from a group consisting of:
an announcement, wherein the announcement is a greeting based at least in part on the personal information;
an advertisement, wherein the advertisement is based at least in part on the Internet browsing trends; and
a listening preference based at least in part of the personal information.

15. The computer system of claim 13, wherein delivering the determined first customized message for the identified caller and the determined second customized message for the identified at least one recipient to one or more of the identified caller and the identified at least one recipient further comprises program instructions, stored on the one or more computer readable storage media, to:
determine whether a voice channel is enabled;
responsive to determining the voice channel is not enabled, retrieve the determined first customized message for the identified caller that is a customized audio response for the identified caller, and the determined second customized message for the identified at least one recipient that is a customized audio response for the identified at least one recipient, from a repository; and replace one or more or the following: a ringtone of the caller and a ring back tone of the at least one recipient, with the determined first customized message for the identified caller and the determined second customized message for the identified at least one recipient from the repository.

16. The computer system of claim 13, wherein delivering the determined first customized message for the identified caller and the determined second customized message for the identified at least one recipient to one or more of the identified caller and the identified at least one recipient further comprises program instructions, stored on the one or more computer readable storage media, to:
determine whether a voice channel is on hold;
responsive to determining the voice channel is on hold, identify at least one participant on hold;
retrieve data associated with the identified at least one participant on hold, wherein the data includes personal information, Internet browsing trends, and listening preferences;
retrieve the first customized message from a repository based on the retrieved data associated with the identified at least one participant on hold; and
replace a hold tone of the identified at least one participant on hold with the retrieved first customized message.

17. The computer system of claim 13, wherein the communication comprises: telephone calls, video calls, and conference calls.

18. The method of claim 1, further comprising:
determining, by one or more computer processors, whether a voice channel is on hold;
responsive to determining that the voice channel is on hold, determining whether the determined second customized message for the identified at least one recipient was delivered;
responsive to determining that the determined second customized message for the identified at least one recipient was delivered; determining, by one or more computer processors, a third customized message for the identified at least one recipient based at least in part on the retrieved data associated with the identified at least one recipient, wherein the third customized message does not repeat the determined second customized message; and
delivering, by one or more computer processors, the determined third customized message.

19. The computer program product of claim 7, further comprises program instructions, stored on the one or more computer readable storage media, to:
determine whether a voice channel is on hold;
responsive to determining that the voice channel is on hold, determine whether the determined second customized message for the identified at least one recipient was delivered;
responsive to determining that the determined second customized message for the identified at least one recipient was delivered; determine a third customized message for the identified at least one recipient based at least in part on the retrieved data associated with the identified at least one recipient, wherein the third customized message does not repeat the determined second customized message; and
deliver the determined third customized message.

20. The computer system of claim 13, further comprises program instructions, stored on the one or more computer readable storage media, to:
determine whether a voice channel is on hold;
responsive to determining that the voice channel is on hold, determine whether the determined second customized message for the identified at least one recipient was delivered;
responsive to determining that the determined second customized message for the identified at least one recipient was delivered; determine a third customized message for the identified at least one recipient based at least in part on the retrieved data associated with the identified at least one recipient, wherein the third customized message does not repeat the determined second customized message; and
deliver the determined third customized message.

* * * * *